No. 685,350. Patented Oct. 29, 1901.
J. U. SARGENT.
SCRAPER AND GRADER.
(Application filed July 15, 1901.)
(No Model.)
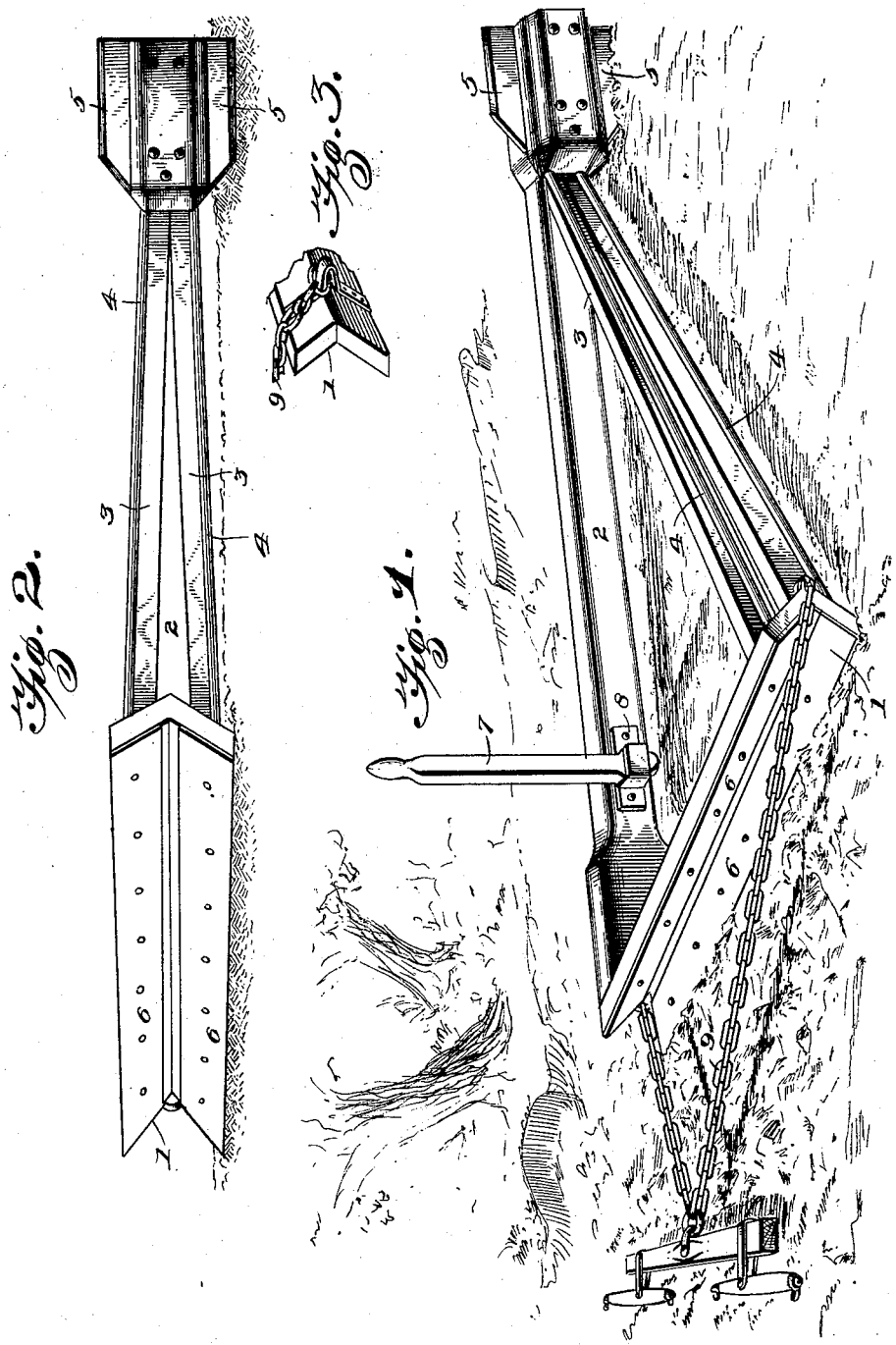
Witnesses
J. U. Sargent, Inventor
by C. A. Snow & Co.
Attorneys

UNITED STATES PATENT OFFICE.

JACOB U. SARGENT, OF MARYSVALE, UTAH, ASSIGNOR OF ONE-HALF TO JOHN H. FULLMER, OF CIRCLEVILLE, UTAH.

SCRAPER AND GRADER.

SPECIFICATION forming part of Letters Patent No. 685,350, dated October 29, 1901.

Application filed July 15, 1901. Serial No. 68,378. (No model.)

*To all whom it may concern:*

Be it known that I, JACOB U. SARGENT, a citizen of the United States, residing at Marysvale, in the county of Piute and State of Utah, have invented a new and useful Scraper and Grader, of which the following is a specification.

My invention is an improved scraper and grader; and it consists in the peculiar construction and combination of devices hereinafter fully set forth and claimed.

The object of my invention is to provide an improved scraper and grader which is extremely cheap and simple and is efficient in throwing the earth in either direction desired.

In the accompanying drawings, Figure 1 is a perspective view of a grader and scraper constructed in accordance with my invention. Fig. 2 is a side elevation of the same. Fig. 3 is a detail view.

In the embodiment of my invention the scraper 1 has one end attached to the front end of a rearwardly-extending guide-bar 2, is disposed obliquely at a suitable angle with relation to the guide-bar, and is further connected thereto by means of suitable braces 3. As here shown, bolt-rods 4 are also used in addition to the braces 3 to strengthen the connection between the braces, the guide-bar, and the scraper. In practice the guide-bar is about two and one-half times as long as the scraper; but these proportions may be varied as may be required. The guide-bar is provided on opposite sides at its rear end with blade-runners 5.

The front side or face of the scraper is hollowed or concaved, as shown, and is provided on opposite sides with scraper-blades 6, which are preferably of iron or steel. The sides of the scraper are parallel, and the scraper may be run with either side down in order to cause the earth to be moved in either direction required from the line of draft. In order to readily overturn the scraper to reverse the position thereof, I provide a hand-lever 7, which may be readily stepped in and unshipped from a keeper 8 on the inner side of the guide-bar, near the front end of the latter.

It will be understood that no matter in which position the scraper and grader may be disposed for operation one of the blade-runners 5 at the rear end of the guide-bar will be on the under side thereof and will cut a furrow of slight width in the soil as the machine advances. The function of the blade-runners is to prevent lateral deflection of the rear end of the guide-bar from the line of draft, and hence the scraper and grader will travel in a straight line.

A draft-chain 9 has its ends connected to the ends of the scraper 1. The single or double tree is attached at any suitable point to the draft-chain.

Having thus described my invention, I claim—

1. A scraper and grader comprising a guide-bar disposed in the line of draft, a scraper having one end attached to the front end of the guide-bar, said scraper being disposed obliquely with relation to said guide-bar, the latter having a longitudinally-disposed blade-runner at its rear end adapted to furrow in the ground and thereby prevent the rear end of the guide-bar from being deflected laterally from the line of draft, braces between said guide-bar and said scraper and bolt-rods disposed on the outer sides of said braces and connecting said guide-bar and said scraper, substantially as described.

2. A scraper and grader comprising a guide-bar disposed in the line of draft, a scraper having one end attached to the front end of the guide-bar, said scraper being disposed obliquely with relation to said guide-bar and having a concaved face and provided on opposite sides with scraper-blades, blade-runners at the rear end of the guide-bar on opposite sides thereof and adapted to furrow in the ground, for the purpose set forth, and a hand-lever detachably connected to the draft-bar for overturning the scraper and grader and thereby reversing the position thereof, for the purpose set forth, substantially as described.

In testimony that I claim the foregoing as my own I have hereto affixed my signature in the presence of two witnesses.

JACOB U. SARGENT.

Witnesses:
G. W. HESSEMER,
WILLIAM E. WHITE.